US007471987B2

(12) United States Patent
Crystal et al.

(10) Patent No.: US 7,471,987 B2
(45) Date of Patent: Dec. 30, 2008

(54) DETERMINING LOCATION OF AN AUDIENCE MEMBER HAVING A PORTABLE MEDIA MONITOR

(75) Inventors: Jack C. Crystal, Owings Mill, MD (US); James M. Jensen, Columbia, MD (US)

(73) Assignee: Arbitron, Inc., Columbia, MD (US)

( * ) Notice: Subject to any disclaimer, the term of this patent is extended or adjusted under 35 U.S.C. 154(b) by 1142 days.

(21) Appl. No.: 10/093,676

(22) Filed: Mar. 8, 2002

(65) Prior Publication Data

US 2003/0171833 A1 Sep. 11, 2003

(51) Int. Cl.

| | |
|---|---|
| ***G06F 17/00*** | (2006.01) |
| ***H04H 60/33*** | (2008.01) |
| ***H04H 60/32*** | (2008.01) |
| ***H04H 20/47*** | (2008.01) |
| ***H04H 20/48*** | (2008.01) |
| ***H04N 5/64*** | (2006.01) |
| ***H04B 1/16*** | (2006.01) |
| ***H04B 3/00*** | (2006.01) |
| ***H04R 5/02*** | (2006.01) |
| ***H04R 29/00*** | (2006.01) |
| ***H04R 3/00*** | (2006.01) |
| ***G09F 27/00*** | (2006.01) |

(52) U.S. Cl. ................................ 700/94; 725/9; 725/10; 725/11; 725/14; 725/20; 348/837; 348/838; 455/343.2; 455/343.3; 455/343.4; 381/311; 381/124; 381/56; 381/77; 381/92; 381/2; 381/6

(58) Field of Classification Search .................... 700/94; 455/2.01, 343.2–343.4, 556.1; 725/22, 14, 725/20, 35, 10, 9, 11; 348/837, 838; 381/2, 381/56, 58, 77, 6, 14, 16, 310, 311, 124

See application file for complete search history.

(56) References Cited

U.S. PATENT DOCUMENTS

| | | | | |
|---|---|---|---|---|
| 4,930,011 | A | 5/1990 | Kiewit | |
| 4,931,865 | A * | 6/1990 | Scarampi | 725/12 |
| 5,218,641 | A * | 6/1993 | Abe et al. | 381/79 |
| 5,382,970 | A | 1/1995 | Kiefl | |
| 5,483,276 | A | 1/1996 | Brooks et al. | |
| 5,768,680 | A | 6/1998 | Thomas | |
| 5,787,334 | A | 7/1998 | Fardeau et al. | |
| 6,329,908 | B1 * | 12/2001 | Frecska | 340/384.7 |
| 6,459,371 | B1 * | 10/2002 | Pike | 340/539.1 |
| 6,647,548 | B1 * | 11/2003 | Lu et al. | 725/20 |
| 2002/0087974 | A1 * | 7/2002 | Sprague | 725/32 |
| 2003/0136827 | A1 * | 7/2003 | Kaneko et al. | 235/375 |
| 2003/0170001 | A1 | 9/2003 | Breen | 386/46 |

FOREIGN PATENT DOCUMENTS

| | | |
|---|---|---|
| WO | WO 91/11062 | 7/1991 |
| WO | WO200072309 A1 * | 11/2000 |
| WO | WO 200072309 A1 * | 11/2000 |

* cited by examiner

*Primary Examiner*—Vivian Chin
*Assistant Examiner*—Devona E. Faulk
(74) *Attorney, Agent, or Firm*—Katten Muchin Rosenman LLP; Peter Zura

(57) ABSTRACT

Systems, methods and devices for gathering data concerning media usage by predetermined audience members. An audience measurement code in acoustic energy produced by a media receiver is detected by a portable media monitor. The monitor also detects a location code produced in a vicinity of the media receiver.

16 Claims, 7 Drawing Sheets

60

80

100

DETERMINING LOCATION OF AN AUDIENCE MEMBER HAVING A PORTABLE MEDIA MONITOR

BACKGROUND OF THE INVENTION

The present invention concerns systems, methods and devices for gathering data concerning media usage by predetermined audience members.

Estimates of media usage are an important tool employed by advertisers. In addition to information of the numbers of audience members receiving media from a given station, channel or source and the days and times such media was received, advertisers would like to know where the audience members were when exposed to the media.

It has been proposed to distribute audio media having identification codes for use in identifying the persons who received the media and the times of receipt. This would be accomplished by receiving the encoded audio media using a monitor permanently located at each media receiving device, separating the identification codes in the permanently located monitor and wirelessly transmitting the separated identification codes from the permanently located monitor to a portable signal detector unit carried by an audience member. The portable unit would then detect the codes from the transmission and store them for subsequent use in producing audience estimates.

The proposal includes generating a local identification code in the permanently located monitor at each receiver, adding this further code to the wireless transmission and receiving the further code in the portable signal detector. The received further code would then be used to identify the audience member's location at the receiver at a given time.

The proposed technique is cumbersome and expensive, since it requires the use of monitors permanently located at each receiver to pick up the audio signal and separate the identification codes from it. Then, after transmission, the identification codes must be detected in the portable signal detector. Consequently, relatively complex and expensive monitoring devices must be deployed at each receiver. Such monitoring devices must also be arranged to pick up the audio produced by the receiver, which requires either an electrical connection to the receiver or the use of a microphone permanently positioned on or very close to a speaker of the receiver.

SUMMARY OF THE INVENTION

For this application the following terms and definitions shall apply, both for the singular and plural forms of nouns and for all verb tenses:

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested.

The term "media data" as used herein means data which is widely accessible, whether over-the-air, or via cable, satellite, network, internetwork (including the internet), distributed on storage media, or otherwise, without regard to the form or content thereof.

The term "media receiver" as used herein means any system, apparatus or device which can serve to reproduce audio media data acoustically, with or without reproduction of any other form of media data.

The terms "audience" and "audience member" mean a person or persons, as the case may be, who access media data in any manner, whether alone or in one or more groups, whether in the same or various places, and whether at the same time or at various different times.

The term "amplitude" as used herein refers to values of energy, power, voltage, current, charge, intensity, size, magnitude, and/or pressure, however measured or evaluated, whether on an absolute or relative basis, on a discrete or continuous basis, on an instantaneous or accumulated basis, or otherwise.

The terms "coupled", "coupled to" and "coupled with" as used herein each means a relationship between or among two or more devices, apparatus, files, programs, media, components, networks, systems, subsystems and/or means, constituting any one or more of (a) a connection whether direct or through one or more other devices, apparatus, files, programs, media, components, networks, systems, subsystems or means, (b) a communications relationship whether direct or through one or more other devices, apparatus, files, programs, media, components, networks, systems, subsystems, or means, or (c) a functional relationship in which the operation of any one or more thereof depends, in whole or in part, on the operation of any one or more others thereof.

The terms "communicate" and "communication" as used herein include both conveying data from a source to a destination, and delivering data to a communications medium, system or link to be conveyed to a destination.

The term "processor" as used herein means processing devices, apparatus, programs, circuits, systems and subsystems, whether implemented in hardware, software or both.

In accordance with an aspect of the present invention, a system is provided for gathering data to produce estimates of media audiences based on acoustic energy emitted by a media receiver. The system comprises a first acoustic transmitter emitting a first acoustic location code in a predetermined area in which the media receiver is located, the first acoustic location code indicating a location of the media receiver; and a portable media monitor capable of being carried on the person of an audience member, the portable media monitor comprising: an acoustic transducer producing transducer output data in response to received acoustic energy, including acoustic energy from the media receiver and from the first acoustic transmitter; an audience measurement code detector coupled with the acoustic transducer to receive the transducer output data, the audience measurement code detector detecting audience measurement codes emitted acoustically from the media receiver based on the transducer output data and producing detected audience measurement code data based on the detected audience measurement codes; a location code detector coupled with the acoustic transducer to receive the transducer output data, the location code detector detecting the first acoustic location code emitted by the first acoustic transmitter based on the transducer output data and producing detected first location code data based on the detected first acoustic location code; and a first communication device for communicating the detected audience measurement code data and the detected first location code data to an audience estimate producing system for producing audience estimate data based on the detected audience measurement code data and the detected first location code data.

In accordance with another aspect of the present invention, a method is provided for gathering data to produce estimates of media audiences based on acoustic energy emitted by a media receiver. The method comprises receiving acoustic energy in an acoustic transducer, including acoustic energy from a media receiver and a first acoustic location code emitted acoustically from an acoustic transmitter in a predetermined area in which the media receiver is located, to produce transducer output data in response thereto; detecting audience measurement codes based on the transducer output data; producing detected audience measurement code data based on the detected audience measurement codes; detecting the first acoustic location code based on the transducer output data; producing detected first acoustic location code data based on the detected first acoustic location code; and communicating the detected audience measurement code data and the detected first location code data to an audience estimate producing system for producing audience estimate data based on the detected audience measurement code data and the detected first location code data.

In accordance with a further aspect of the present invention, a portable media monitor is provided for gathering data concerning media usage by a predetermined audience member. The portable media monitor comprises an acoustic transducer operative to produce transducer output data in response to received acoustic energy including acoustic energy from a media receiver and a location code emitted acoustically from an acoustic transmitter in a predetermined area in which the media receiver is located to indicate a location of the predetermined audience member in such predetermined area; an audience measurement code detector coupled with the acoustic transducer to receive the transducer output data, the audience measurement code detector being operative to detect audience measurement codes in the acoustic energy from the media receiver based on the transducer output data and to produce detected audience measurement code data based on the detected audience measurement codes; a location code detector coupled with the acoustic transducer to receive the transducer output data, the location code detector being operative to detect the location code based on the transducer output data and produce detected location code data based on the detected location code; and a communication device for communicating the detected audience measurement code data and the detected location code data for input to an audience estimate producing system.

In accordance with a still further aspect of the present invention, a portable media monitor for gathering data concerning media usage by a predetermined audience member is provided. The portable media monitor comprises means for transducing acoustic energy to produce transduced output data; means for detecting audience measurement codes present in the acoustic energy based on the transduced output data to produce detected audience measurement code data, the audience measurement codes being included in acoustic energy emitted by a media receiver; means for detecting a first location code present in the acoustic energy based on the transduced output data to produce detected first location code data, the first location code being emitted acoustically from an acoustic transmitter in a predetermined area in which the media receiver is located to indicate a location of a predetermined audience member in such predetermined area; and first communication means for communicating the detected audience measurement code data and the detected first location code data for input to an audience estimate producing system.

In accordance with yet another aspect of the present invention, an acoustic location code emitter is provided. The acoustic location code emitter comprises code producing means for emitting an acoustic location code within an audible frequency range; and monitor means for monitoring ambient acoustic energy in a predetermined area in which the code producing means is located to produce ambient acoustic energy data; the code producing means being operative to establish an amplitude of the acoustic location code in response to the ambient acoustic energy data such that the acoustic location code is masked by the ambient acoustic energy.

In accordance with a yet still further aspect of the present invention, a method is provided for producing an acoustic location code. The method comprises emitting an acoustic location code within an audible frequency range and at an emission location; monitoring ambient acoustic energy in a predetermined area including the emission location to produce ambient acoustic energy data; and establishing an amplitude of the acoustic location code in response to the ambient acoustic energy data such that the acoustic location code is masked by the ambient acoustic energy.

In accordance with yet still another aspect of the present invention, an acoustic location code emitter is provided. The acoustic location code emitter comprises a code emitter operative to emit an acoustic location code within an audible frequency range; a transducer having an input to receive ambient acoustic energy in a predetermined area in which the code emitter is located and operative to produce transduced ambient acoustic energy data; and a processor having an input coupled with the transducer to receive the transduced ambient acoustic energy data and operative in response to the ambient acoustic energy data to establish an amplitude of the acoustic location code such that the acoustic location code is masked by the ambient acoustic energy.

In accordance with another aspect of the present invention, a portable media monitor is provided for gathering data to produce estimates of media audiences based on acoustic energy emitted by a media receiver, the portable media monitor capable of being carried on the person of an audience member. The portable media monitor comprises acoustic transducer means for producing transducer output data in response to received acoustic energy including acoustic energy from a media receiver; audience measurement code detector means for detecting audience measurement codes emitted acoustically from the media receiver based on the transducer output data to produce detected audience measurement code data; location code detector means for detecting a location code transmitted wirelessly in a predetermined area in which the media receiver is located, to produce detected location code data; and communication means for communicating the detected audience measurement code data and the detected location code data to an audience estimate producing system for producing audience estimate data based on the detected audience measurement code data and the detected location code data.

In accordance with still another aspect of the present invention, a method for gathering data to produce estimates of media audiences based on acoustic energy emitted by a media receiver is provided. The method comprises transducing acoustic energy received by a portable media monitor to produce transduced output data; detecting audience measurement codes emitted acoustically from a media receiver based on the transduced output data to produce detected audience measurement code data; detecting a wirelessly transmitted location code in the portable media monitor to produce detected location code data, the location code being transmitted wirelessly in a predetermined area in which the media receiver is located; and communicating the detected audience measurement code data and the detected location code data to an audience estimate producing system for producing audience estimate data based on the detected audience measurement code data and the detected location code data.

In accordance with a still further aspect of the present invention, a portable media monitor for gathering data to produce estimates of media audiences based on acoustic energy emitted by a media receiver is provided, the portable media monitor capable of being carried on the person of an audience member. The portable media monitor comprises an acoustic transducer operative to produce transducer output data in response to received acoustic energy including acoustic energy from a media receiver; an audience measurement code detector coupled with the acoustic transducer to receive the transducer output data, the audience measurement code detector being operative to detect audience measurement codes emitted acoustically from the media receiver based on the transducer output data and to produce detected audience measurement code data based on the detected audience measurement codes; a location code detector operative to detect a location code transmitted wirelessly in a predetermined area in which the media receiver is located and to produce detected location code data based on the detected location code; and a communication device for communicating the detected audience measurement code data and the detected location code data to an audience estimate producing system for producing audience estimate data based on the detected audience measurement code data and the detected location code data.

DETAILED DESCRIPTION OF CERTAIN ADVANTAGEOUS EMBODIMENTS

Figure 1:
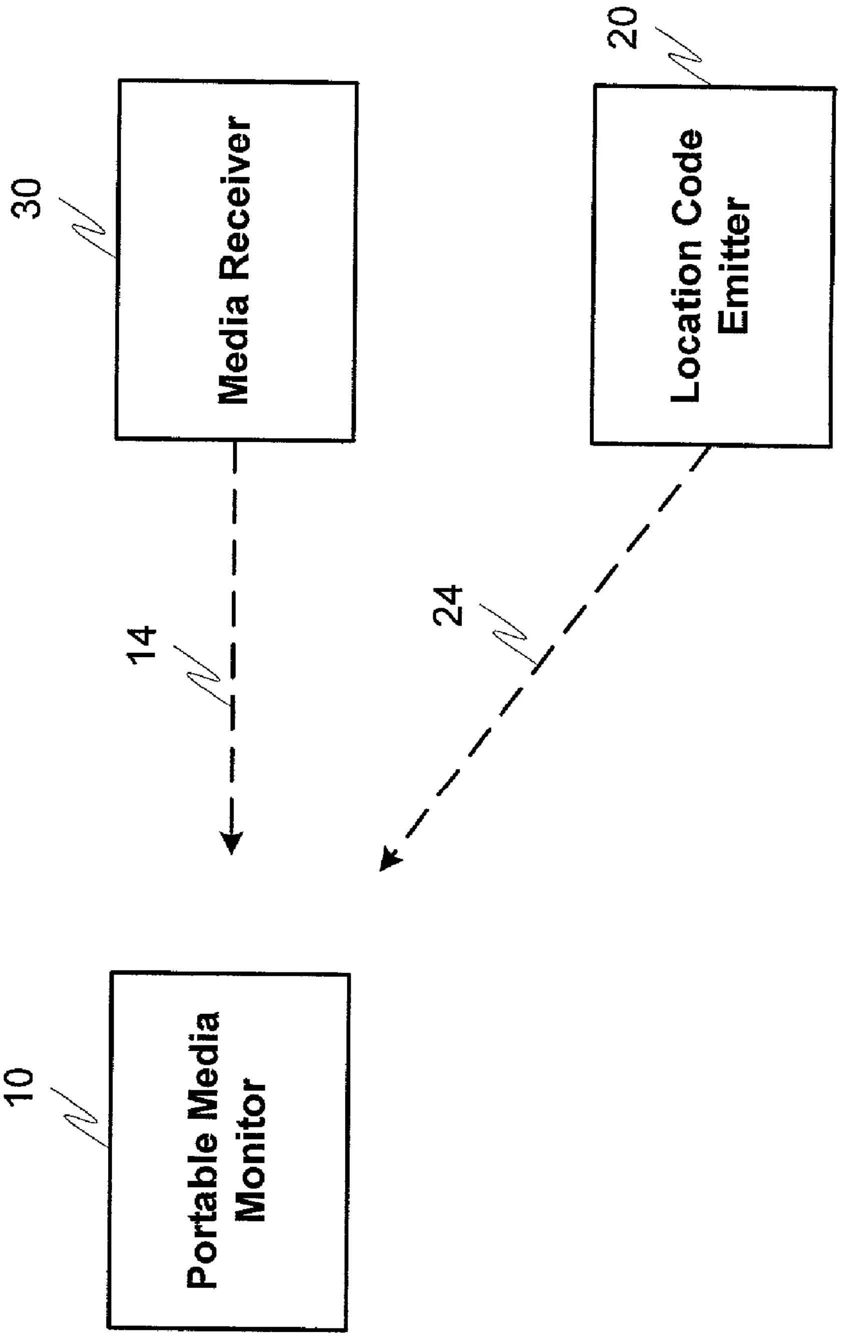
FIG. 1 is a schematic diagram illustrating a system for use in gathering audience measurement data in accordance with certain embodiments of the present invention.

FIG. 1 schematically illustrates a system for gathering data for producing estimates of media audiences. The system includes a portable media monitor 10 and a location code emitter 20. The portable media monitor 10 receives acoustic energy 14 from a media receiver 30 which the media receiver 30 has reproduced from received media data. The acoustic energy 14 may include, for example, a radio program, the audio portion of a television broadcast, audio delivered as streaming media, sounds reproduced from a audio file or from a record such as a CD, DVD, tape or other recording medium, a movie sound track, etc.

The portable media monitor 10 serves to detect audience measurement codes included in the acoustic energy 14 from the media receiver 30 in order to gather data for producing audience estimates. The audience measurement codes may convey any information useful in producing audience estimates, such as the identity of a radio station, television station, website, originator, network, channel, source, type of media, type of data, duration, instructions, and so forth. The portable media monitor 10 detects the audience measurement codes included in the acoustic energy 14 from the media receiver 30 and either stores the codes or data based thereon for subsequent communication to an audience estimate producing system for use in producing audience estimates, or else communicates the codes or data based thereon without storage for such use by such an audience estimate producing system.

The portable media monitor 10 is limited in size and configured to be carried about by an audience member, in order to gather data concerning media to which the audience member has been exposed. The portable media monitor 10 in certain embodiments is packaged similarly to a pager device and includes a clip or other appropriate means for affixing it to a belt, strap or other part of the audience member's clothing. The monitor 10 may also be packaged in a wrist watch, article of jewelry or in any other article or device of a kind which is or may be conveniently carried about.

The location code emitter 20 transmits a location code 24 wirelessly to be received by the portable media monitor 10 so that the location of the audience member carrying the monitor 10 when exposed to reproduced media may be determined. The location code emitter 20 serves to emit the location code in a predetermined area including the media receiver 30. In certain embodiments the location code emitter 20 is positioned at the location of the media receiver 30 or elsewhere in the same room as the receiver 30. In other embodiments, the location code emitter 20 emits a location code in the same household as the media receiver 30, although not necessarily in the same room as the receiver 30. In still other embodiments, the location code emitter 20 emits the location code in a vehicle used by an audience member. In still further embodiments, the location code emitter 20 emits the location code at an audience member's workplace at the location of the media receiver used by the audience member, or in the audience member's office or workspace, or other location within the workplace. In yet still further embodiments, the location code emitter is positioned at or near billboards or other sources of advertisements, or on trains, aircraft, stores, malls, along highways or other public places.

The location code emitter 20 in certain embodiments emits an acoustic location code. In other embodiments the location code emitter 20 emits a radio frequency location code, an infrared location code, or a location code in a different form of electromagnetic energy.

In still other embodiments, the system includes multiple location code emitters, a first emitter being positioned in a household of a predetermined audience member along with a second location code emitter positioned at a location outside the household. In certain embodiments, the second location code emitter is positioned in a vehicle used by the predetermined audience member, while in still others, the second location code emitter is positioned in a workplace of the predetermined audience member.

Figure 2:
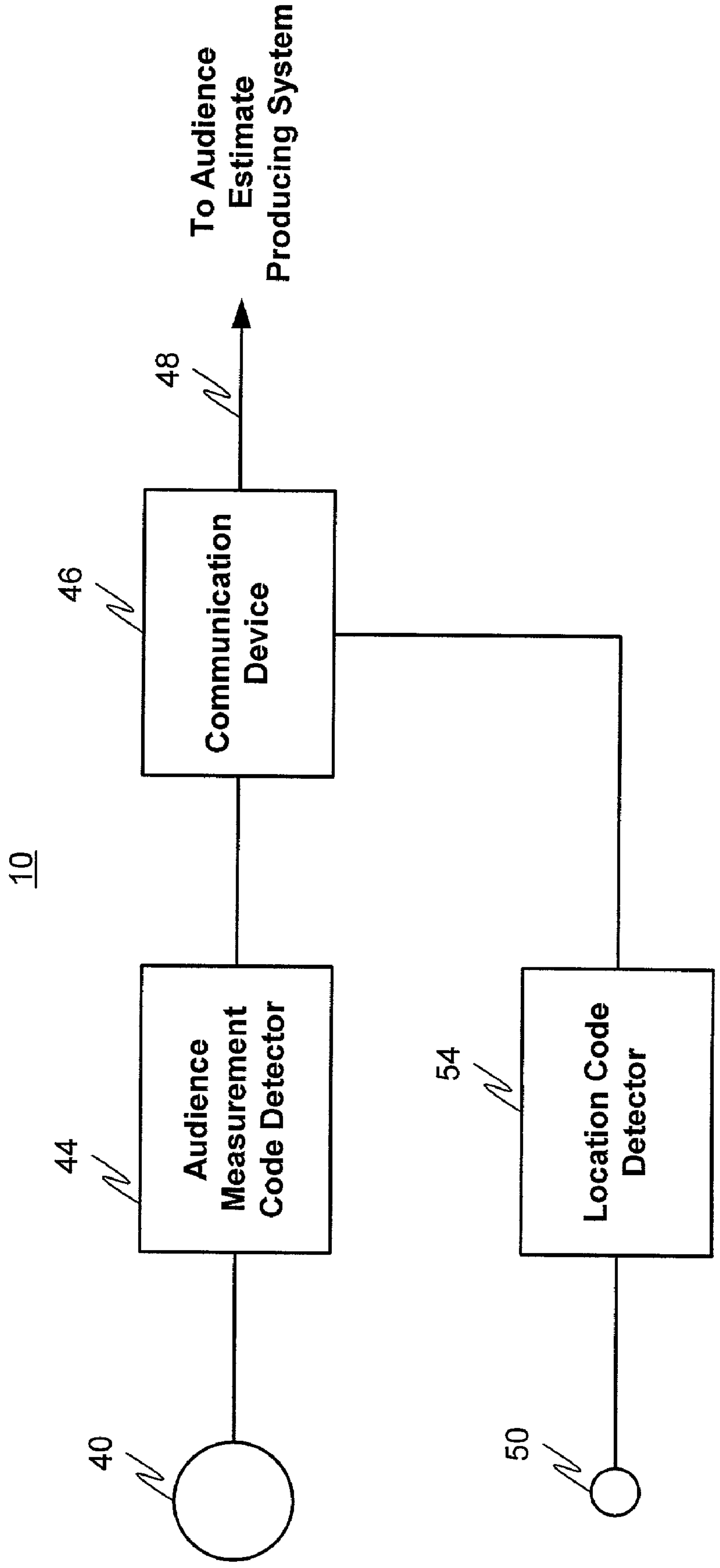
FIG. 2 is a functional block diagram of a portable media monitor in accordance with certain embodiments of the present invention.

The functional block diagram of FIG. 2 illustrates the portable media monitor 10 having an acoustic transducer 40 which serves to produce output data in response to received acoustic energy including acoustic energy from the media receiver 30. The transducer 40 is coupled with an audience measurement code detector 44 to supply the transducer output data thereto. The audience measurement code detector 44 serves to detect audience measurement codes emitted acoustically from the media receiver 30 based on the transducer output data. The audience measurement code detector 44 produces detected audience measurement code data corresponding to the detected audience measurement codes and which either maintain the same format or are reformatted, for example, for compression.

The audience measurement code detector 44 supplies the detected audience measurement code data to a communication device 48 which serves to communicate the detected audience measurement code data to an audience estimate producing system through an output 48. In other embodiments, the monitor 10 includes a memory (not shown for purposes of simplicity and clarity) which serves to store the detected audience measurement code data for subsequent communication to the audience estimate producing system via the communication device 46.

The monitor 10 also includes a wireless location code input 50 which receives energy including the wirelessly conveyed location code from the code emitter 20. A location code detector 54 is coupled with the input 50 to obtain the energy received thereby, and serves to detect the location code in the received energy. The location code detector 54 produces detected location code data based on the detected location code and which either retains its format or is reformatted, for example, for compression. The location code detector 54 is coupled with the communication device 46 in order to supply the detected location code data thereto for communication to the audience estimate producing system.

When the audience estimate producing system receives the detected audience measurement code data and the detected location code data from the portable media monitor 10, it produces audience estimates for media data reproduced by the media receiver 30 in order to produce reports of interest to advertisers, broadcasters, cablecasters, on-line services, content providers, and the like.

Figure 3:
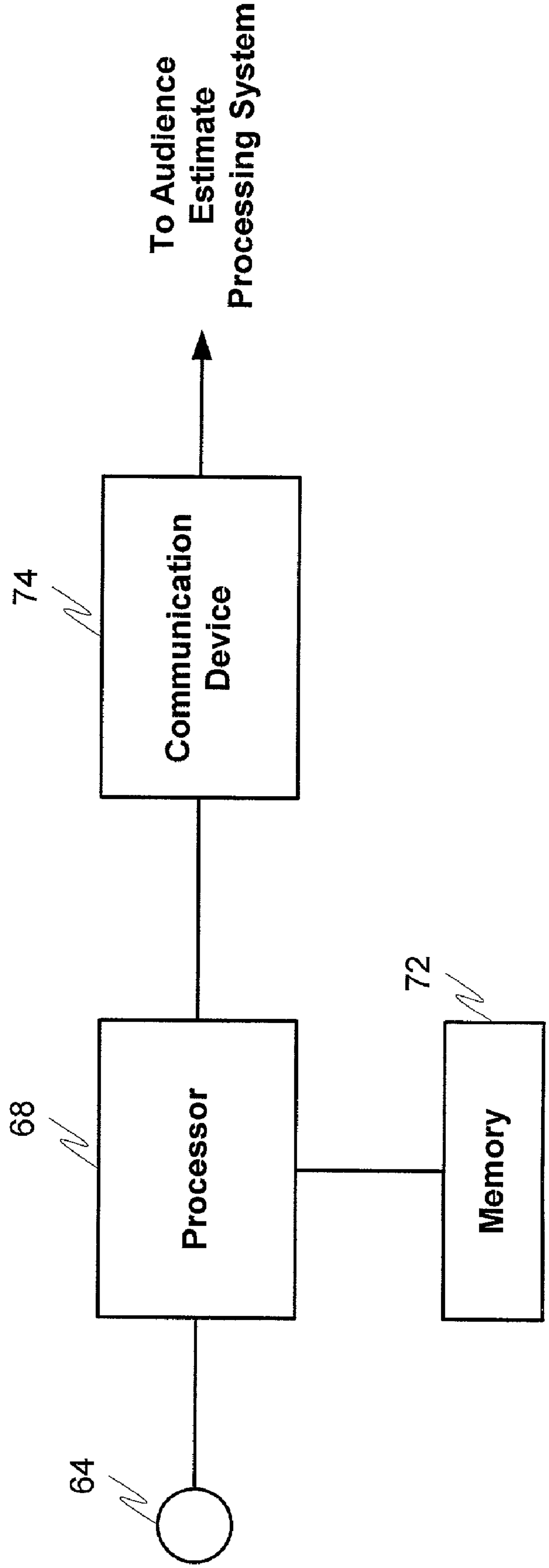
FIG. 3 is a block diagram of a portable media monitor in accordance with certain embodiments of the present invention in which acoustic location codes are detected.

FIG. 3 is a block diagram of an embodiment of a portable media monitor 60 capable of being carried on the person of an audience member, which serves to detect acoustically conveyed location codes. The monitor 60 includes an acoustic transducer 64 which produces transducer output data in response to received acoustic energy, including acoustic energy from the media receiver 30 of FIG. 1. In this embodiment, location code emitter 20 of FIG. 1 is supplied as an acoustic location code emitter that serves to emit an acoustic location code in a predetermined area in which the media receiver 30 is located in order to indicate its location.

Monitor 60 further includes a processor 68 which is coupled with the transducer 64 to receive the transducer output data and serves to detect audience measurement codes emitted acoustically from the media receiver 30 based on such transducer output data. The processor 68 produces detected audience measurement code data based on the detected audience measurement codes and which either retains their format or is translated to a different format. The processor 68 stores the detected audience measurement code data in a memory 72.

The processor 68 also serves as a location code detector to detect acoustic location codes present in the transducer output data and conveyed wirelessly by an acoustic location code emitter. The processor 68 produces detected location code data based on the detected acoustic location code and which either retains the same format or is reformatted. The processor 68 also stores the detected location code data in the memory 72.

In certain embodiments, a second acoustic transducer is incorporated in the monitor 60 to pick up the acoustic location codes and supply the same to the processor 68 for detecting the location code data.

From time to time, the processor 68 communicates the detected audience measurement code data and detected location code data which has been stored in the memory 72 to an audience estimate processing system by means of a communication device 74, for producing audience estimate data based on the detected audience measurement code data and the detected first location code data.

The processor 68 is arranged to detect the audience measurement codes based on the type of encoding used to produce the codes and include them in the audio media data emitted by the media receiver 30. Several advantageous and suitable techniques for detecting audience measurement codes in audio media data are disclosed in U.S. Pat. No. 5,764,763 to James M. Jensen, et al., which is assigned to the assignee of the present application and which is incorporated by reference herein. Other appropriate decoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

Still other suitable decoders are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al., all of which are incorporated herein by reference.

In certain embodiments, the processor 68 transforms the transducer output data to frequency-domain data and processes the frequency-domain data to detect audience measurement codes therein. Where the codes have been formed as in the Jensen, et al., U.S. Pat. No. 5,764,763 or U.S. Pat. No. 5,450,490, the frequency-domain data is processed by processor 68 to detect code components with predetermined frequencies. Where the codes have been formed as in the Srinivasan PCT Publication No. WO 00/04662, the processor 68 processes the frequency-domain data to detect code components distributed according to a frequency-hopping pattern. In certain embodiments, the code components comprise pairs of frequency components modified in amplitude to encode information, and the processor 68 detects such amplitude modifications. In certain other embodiments, the code components comprise pairs of frequency components modified in phase to encode information, and the processor 68 detects such phase modifications. Where the codes have been formed as spread spectrum codes, as in the Aijala, et al., U.S. Pat. No. 5,579,124 or the Preuss, et al., U.S. Pat. No. 5,319,735, the processor 68 comprises an appropriate spread spectrum decoder.

Figure 4:
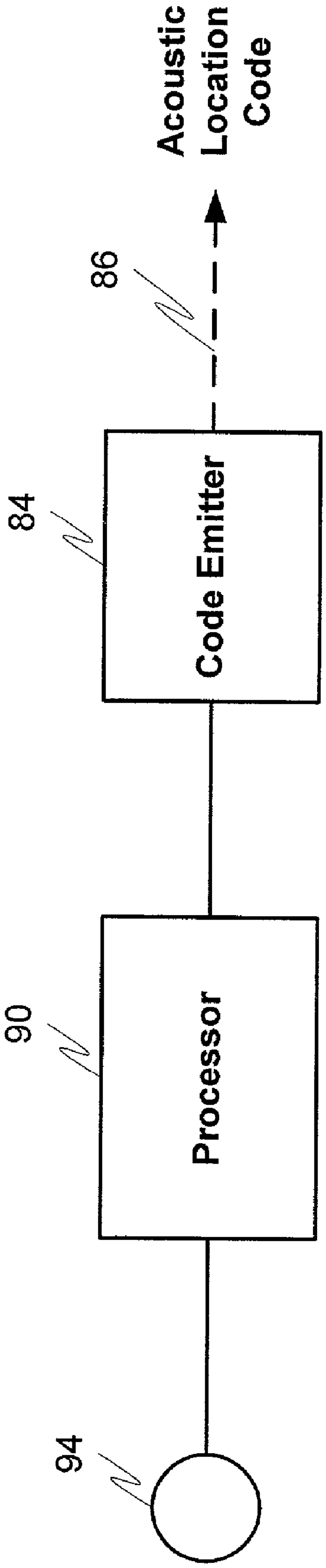
FIG. 4 is a block diagram of an acoustic location code emitter in accordance with certain embodiments of the present invention.

An advantageous embodiment of an acoustic location code emitter 80 suitable for use with the monitor 60 of FIG. 3, is illustrated in FIG. 4. A code emitter 84 produces and emits an inaudible acoustic location code 86 within an audible frequency range under the control of a processor 90. The processor 90 is coupled with an acoustic transducer 94 which monitors ambient acoustic energy in a predetermined area including the emitter 80 to produce ambient acoustic energy data. The processor 90 is coupled with the transducer 94 to receive the ambient acoustic energy data and serves to establish an amplitude of the acoustic location code emitted by the code emitter 84 in response to the ambient acoustic energy data, so that the acoustic location code is masked by ambient acoustic energy.

The code emitter 84 produces a code having one or more symbols to represent the location of at least one media receiver 30 and which is formatted to be decoded by the monitor 60.

In a particularly advantageous embodiment, the acoustic location code is produced by the emitter 80 in accordance with the teachings of U.S. Pat. No. 5,764,763 to James M. Jensen, et al., which is assigned to the assignee of the present application and which is incorporated by reference herein. In accordance with U.S. Pat. No. 5,764,763, at least one code symbol produced by the emitter 80 comprises a plurality of predetermined frequency components each having a fixed frequency. The processor 90 evaluates the ability of the ambient acoustic energy to mask each of the fixed frequency components of each symbol, and adjusts the amplitude of each thereof so that when it is emitted by the code emitter 84, it is masked by the ambient acoustic energy.

Further encoding techniques suitable for use in the location code emitter 80 are disclosed in the various U.S. patents and PCT Publications incorporated by reference herein, as well in U.S. patent application Ser. No. 09/318,045 in the names of Neuhauser, et al., also incorporated by reference herein.

In certain advantageous embodiments, the location code emitter 80 is arranged to produce the acoustic location code in the same manner as the audience measurement codes emitted acoustically from the media receiver 30. In such embodiments it is thus possible to employ the same predetermined detection algorithm in processor 90 both to detect the audience measurement codes from the media receiver 30 and the acoustic location codes emitted from the acoustic location code emitter 80.

Figure 5:
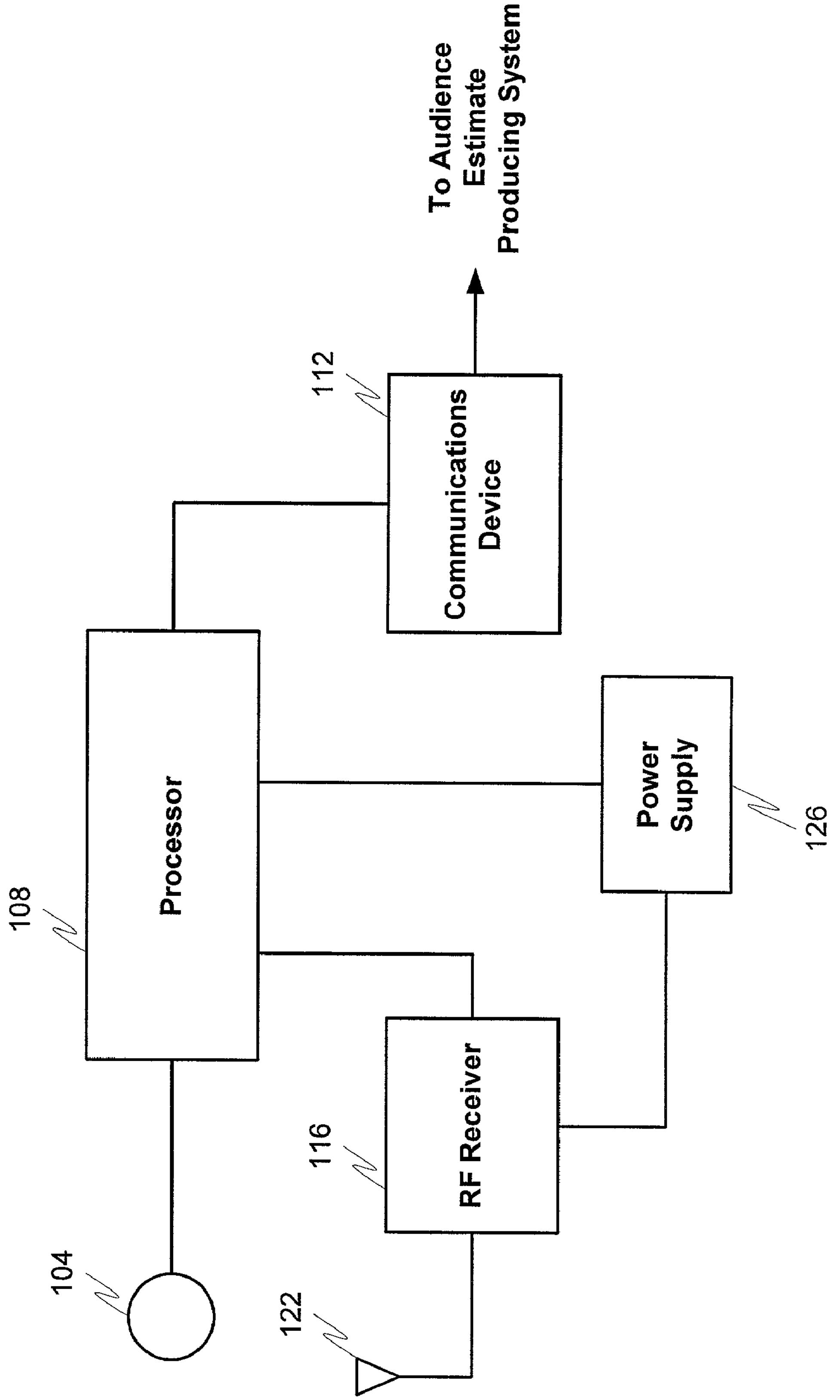
FIG. 5 is a block diagram of a portable media monitor in accordance with certain embodiments of the present invention in which RF location codes are detected.

FIG. 5 illustrates a further embodiment of a portable media monitor 100 for use in data gathering systems in which the location code emitter 20 of FIG. 1 is implemented as a radio frequency code transmitter. The monitor 100 includes an acoustic transducer 104 coupled with a processor 108 and serving to produce transducer output data in response to received acoustic energy, including acoustic energy from a media receiver which may include audience measurement codes. The processor 108 is arranged to detect such codes in the transducer output data which it then either communicates to an audience estimate producing system via a communications device 112 or else stores for subsequent transmission via the device 112 to the audience estimate producing system. The monitor 100 also includes a radio frequency (RF) receiver 116 coupled with an antenna 122 to receive location codes transmitted by radio frequency from the location code emitter 20. The RF receiver 116 is coupled with the processor 108 to supply the received location codes thereto.

If desired, or where necessary, the range of the detectable RF location code can be established either by controlling the intensity of the RF energy emitted by the transmitter or the sensitivity of the receiver 116. Preferably, in such embodiments, the range is controlled at the transmitter so that different ranges can be established at different locations. For example, the detectable range of the transmitter may be selected as 100 to 300 feet in the audience member's household, but only a few feet within the audience member's automobile. For detecting proximity to a billboard, however, the range of a transmitter located in the vicinity of the billboard might exceed several hundred feet, depending on the distance from which the billboard may be viewed by the audience member.

Also as illustrated in FIG. 5, the monitor 100 includes a power supply 126 which is controlled by the processor 108 to supply power to the RF receiver 116. In certain embodiments, the processor 108 controls the power supply 126 to supply power to the RF receiver 116 in response to detection of an audience measurement code by the processor 108. The processor 108 controls the power supply 126 to cut off power to the RF receiver 116 when its use is not required, in order to conserve battery power in the portable monitor 100. In certain embodiments, the processor 108 controls the power supply 126 to cut off power to the RF receiver 116 at times when audience measurement codes are not being received by the processor 108.

Figure 6:
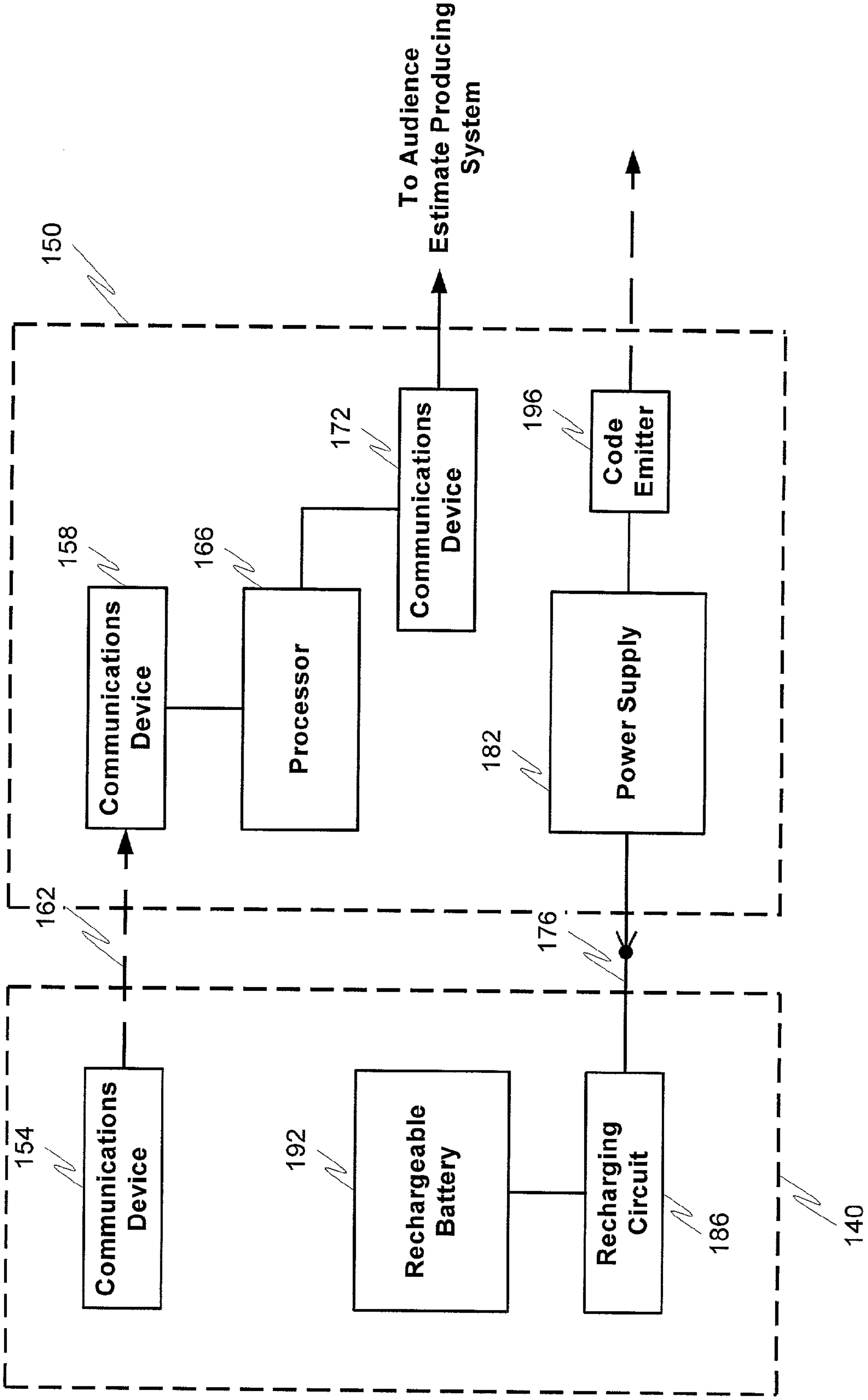
FIG. 6 is a block diagram of a docking station coupled with a portable media monitor in accordance with certain embodiments of the present invention.

FIG. 6 illustrates a portable media monitor 140 coupled with a docking station 150 in order to communicate detected audience measurement code data and detected location code data to an audience estimate producing system, as well as to recharge a battery 192 of the monitor 140. As illustrated in FIG. 6, a communications device 154 of the portable media monitor 140 communicates the detected audience measurement code data and the detected location code data to a communications device 158 wirelessly as indicated at 162. Advantageously, the communications device 154 and the communications device 158 are implemented as infrared transceivers. The communications device 158 is coupled with a processor 166 to supply the received data thereto and also to control the operation of the device 158. The processor 166 is also coupled with a further communications device 172 in order to supply the data thereto and to control the device 172 for communicating the data to the audience estimate producing system.

When the portable media monitor 140 is engaged with the docking station 150 a conductive connection 176 is established between a power supply 182 of the docking station 150 and a recharging circuit 186 of the monitor 140. The rechargeable battery 192 is recharged by the power supply 162 under the control of the circuit 186. In certain embodiments, in docking station is implemented in accordance with the teachings of U.S. Pat. No. 5,483,276 to Brooks, et al., which is assigned to the assignee of the present invention and is incorporated herein by reference.

In certain advantageous embodiments, the docking station 150 includes a location code emitter 196 which emits a location code either in the form of an acoustic location code or an electromagnetic code, for example, as an RF transmission. The code emitter 196 is coupled with the power supply 182 in order to receive power therefrom. In this arrangement, it is unnecessary to provide a separate power supply for operating the location code emitter 196.

Figure 7:
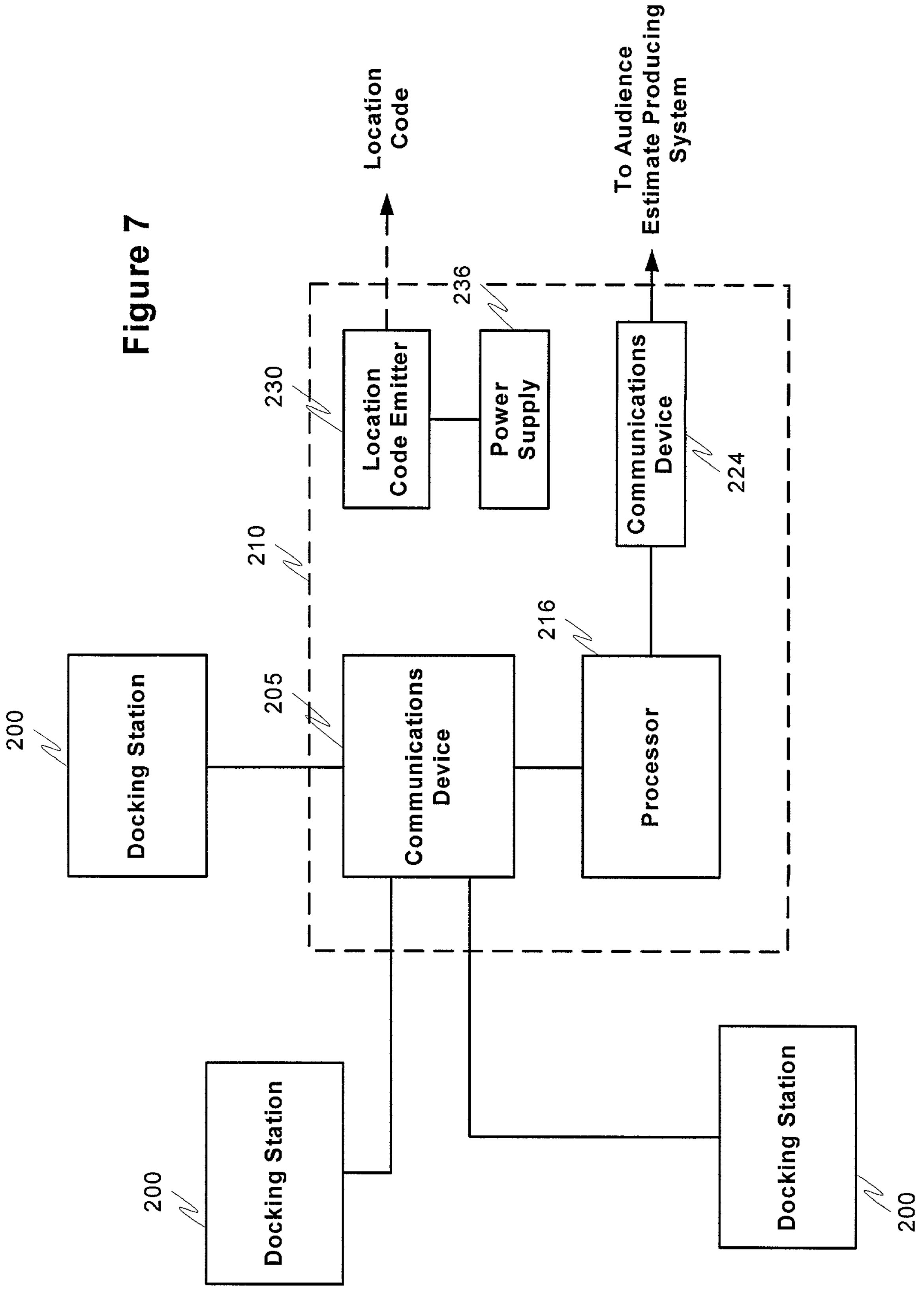
FIG. 7 is a block diagram of a hub coupled with a plurality of docking stations in accordance with certain embodiments of the present invention.

FIG. 7 illustrates an arrangement in which multiple docking stations 200 are placed within a household. In households having more than one audience member participating in gathering audience measurement data, a separate docking station can be provided for each of the various audience members. In the arrangement of FIG. 7, each of the docking stations 200 is coupled with a communications device 205 of a hub 210 in order to communicate the data from the various monitors engaged with the docking stations to the hub 210 for communication to an audience estimate producing system.

The hub 210 includes a processor 216 coupled with the communications device 205 to receive the data therefrom and control its operation. The processor 216 is also coupled with a communications device 224 to provide the data received from the communications device 205 thereto for communication to the audience estimate producing system, as well as to control the operation of the device 224. In certain embodiments, the hub 210 is implemented in accordance with the teachings of U.S. Pat. No. 4,912,552 to Allison, et al., which is assigned to the assignee of the present application and is incorporated herein by reference.

In certain advantageous embodiments, the hub 210 includes a location code emitter 230 for emitting a further location code. The location code emitter 230 is coupled with a power supply 236 of the hub 210 to supply power for operating the emitter 230.

What is claimed is:

1. A portable media monitor for gathering data to produce estimates of media audiences based on acoustic energy emitted by a media receiver, the portable media monitor capable of being carried on the person of an audience member, the portable media monitor comprising:

acoustic transducer for producing transducer output data in response to received acoustic energy including acoustic energy from a media receiver;

audience measurement code detector for detecting audience measurement codes emitted acoustically from the media receiver based on the transducer output data to produce detected audience measurement code data;

location code detector for detecting a location code transmitted wirelessly from a location code emitter in a predetermined area in which the media receiver is located, to produce detected location code data relating to the audience member, wherein the location code detector comprises a radio frequency receiver for receiving the location code as a radio frequency transmission;

means for supplying power to operate the radio frequency receiver in response to detection of an audience code by the audience measurement code detector; and a communicator for communicating the detected audience measurement code data and the detected location code data to an audience estimate producing system for producing audience estimate data based on the detected audience measurement code data and the detected location code data.

2. A system for gathering data to produce estimates of media audiences, comprising the portable media monitor of claim 1, wherein the location code emitter comprises, a wireless transmitter for transmitting the location code wirelessly in the predetermined area.

3. The system of claim 2, wherein the wireless transmitter comprises a radio frequency transmitter, for transmitting the location code as a radio frequency transmission.

4. A method for gathering data to produce estimates of media audiences based on acoustic energy emitted by a media receiver, comprising:

transducing acoustic energy received by a portable media monitor to produce transduced output data;

detecting audience measurement codes emitted acoustically from a media receiver based on the transduced output data to produce detected audience measurement code data;

detecting a wirelessly transmitted location code related to a member of the media audiences in the portable media monitor to produce detected location code data, the location code being wirelessly receiver as a radio frequency transmission from a location code emitter located in a predetermined area in which the media receiver is located;

supplying power to operate the radio frequency receiver means in response to detection of an audience measurement code by the audience measurement code detector means; and communicating the detected audience measurement code data and the detected location code data to an audience estimate producing system for producing audience estimate data based on the detected audience measurement code data and the detected location code data.

5. The method of claim 4, comprising transmitting the location code wirelessly in the predetermined area.

6. The method of claim 5, wherein transmitting the location code comprises transmitting a radio frequency location code, and detecting the wirelessly transmitted location code comprises receiving the radio frequency location code.

7. A portable media monitor for gathering data to produce estimates of media audiences based on acoustic energy emitted by a media receiver, the portable media monitor capable of being carried on the person of an audience member, the portable media monitor comprising:

an acoustic transducer operative to produce transducer output data in response to received acoustic energy including acoustic energy from a media receiver;

an audience measurement code detector operative to detect audience measurement codes emitted acoustically from the media receiver based on the transducer output data to produce detected audience measurement code data;

a location code detector operative to detect a location code, transmitted wireless from a location code emitter in a predetermined area in which the media receiver is located, to produce detected location code data relating to the audience member, wherein the location code detector comprises a radio frequency receiver for receiving the location code as a radio frequency transmission;

a power supply, coupled with the radio frequency receiver, to supply power thereto in response to detection of an audience measurement code by the audience measurement code detector; and a communications device operative to communicate the detected audience measurement code data and the detected location code data to an audience estimate producing system for producing audience estimate data based on the detected audience measurement code data and the detected location code data.

8. A system for gathering data to produce estimates of media audiences, comprising the portable media monitor of claim 7, wherein the location code emitter comprises, a wireless transmitter operative to transmit the location code wirelessly in the predetermined area.

9. The system of claim 8, wherein the wireless transmitter comprises a radio frequency transmitter.

10. The portable media monitor of claim 7 wherein the power supply is operative to cut off power to the radio frequency receiver when audience measurement codes are not detected by the audience measurement code detector.

11. The portable media monitor of claim 7, wherein the audience measurement code detector comprises a processor.

12. The system of claim 8, wherein the wireless transmitter is positioned at a location of the media receiver.

13. The system of claim 8, wherein the media receiver and the wireless transmitter are located in a room.

14. The system of claim 8, wherein the media receiver and the wireless transmitter are located in a household.

15. The system of claim 8, wherein the wireless transmitter is located in a vehicle of an audience member.

16. The system of claim 8, wherein the wireless transmitter is located with the media receiver at an audience member's workplace.

* * * * *